United States Patent Office 2,759,390
Patented Aug. 21, 1956

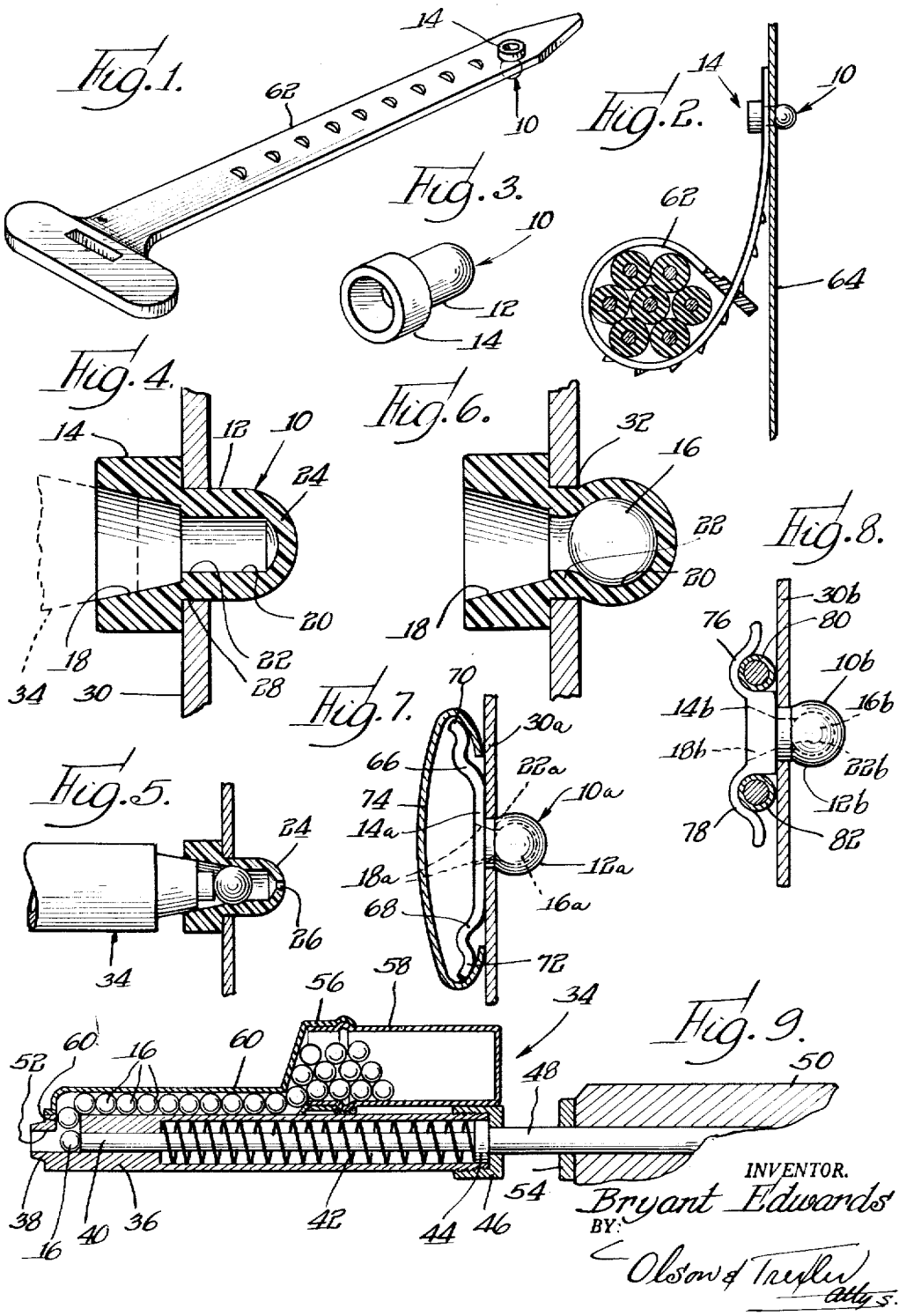

2,759,390

TWO-PIECE EXPANDABLE ELASTIC FASTENING DEVICE OF THE RIVET TYPE

Bryant Edwards, Chicago, Ill., assignor to Illinois Tool Works, Chicago, Ill., a corporation of Illinois Application February 2, 1955, Serial No. 485,643

5 Claims. (Cl. 85—40)

The present invention relates to a novel plastic member adapted to be assembled with an apertured panel or workpiece and more particularly, to a novel stud or fastener assembly.

Various plastic studs or fastener members have heretofore been suggested for application to apertured workpieces and while such devices are satisfactory for many purposes, they cannot be used to the best advantage in certain applications. For example, certain applications require the use of relatively soft material for the stud or fastener so that it will have desired sound deadening qualities and certain applications require the use of a fastener which may be inserted easily through an aperture in a workpiece without forcing. It is, therefore, an object of the present invention to provide a novel stud or fastener device which may be easily applied to an apertured workpiece or panel without strain or injuring the panel.

Another object of the present invention is to provide a novel device of the above described type which may be applied to an apertured workpiece for use as a sound deadening bumper such, for example, as a bumper for a door of an automobile glove compartment.

Another object of the invention is to provide a novel device of the above described type which effectively seals the panel aperture with sealing engagement with both sides of the panel wall and the aperture wall.

A more specific object of the present invention is to provide a novel device of the above described type which includes a hollow deformable plastic shank for insertion through an aperture in a workpiece and a relatively hard or rigid ball or pellet adapted to be inserted and securely retained within the hollow shank for expanding the shank into secure engagement with the workpiece.

Other objects and advantages of the present invention will become apparent from the following description and the accompanying drawings wherein:

Fig. 1 is a perspective view showing a fastening device embodying the principles of this invention applied to a cable retaining strap for connecting the strap to an apertured panel or workpiece;

Fig. 2 is a sectional view showing the assembly of Fig. 1 applied to a workpiece and retaining a cable;

Fig. 3 is a perspective view of a fastening device or stud embodying the principles of this invention;

Figs. 4, 5 and 6 are sectional views illustrating the manner of applying the device of the present invention to an apertured workpiece;

Fig. 7 is a sectional view illustrating the slightly modified form of the present invention wherein the head portion of the fastening device is adapted to retain a molding strip;

Fig. 8 is a sectional view showing another modified form of the present invention wherein the head portion of the device is adapted to clamp wires and the like against a workpiece or panel; and Fig. 9 is a longitudinal sectional view showing a tool which may be used for inserting the pellets or balls into the plastic member of the fastening device.

Referring now more specifically to the drawings wherein like parts are designated by the same numerals throughout the various figures, the fastening device of this invention includes a stud member 10 having a shank portion 12 and a head portion 14. The stud member is made from a relatively soft deformable plastic material which has the characteristic of tending to return to its original molded or cast shape after it has been deformed by the application of pressure thereto. Examples of suitable plastic materials are polystyrene, polyvinyl chloride, and nylon. The fastener assembly or device is completed by a pellet or ball 16 formed from a hard material such as steel. The pellet is used to secure the plastic member in assembled relationship with an apertured workpiece in the manner described below.

As shown best in Fig. 4, the plastic stud member is provided with a central axially extending passageway which includes a flared out portion 18 formed in the head, a bore 20 extending into the shank from an intermediate throat 22. Preferably the bore 20 terminates short of the free entering end of the shank so that the end is closed as indicated at 24. However, if desired a small vent hole 26 may be provided in the closed end 24 as shown in Fig. 5 to permit air to escape from the hollow shank during the insertion of the pellet. It should be noted that the peripheral size and shape or diameter of the shank 12 is initially similar to but slightly less than the size and shape or diameter of the aperture 28 in the workpiece or panel 30 so that the shank may be easily inserted through the aperture without forcing. It should also be noted that the width or diameter of the pellet 16 is substantially greater than the width or diameter of the bore 20 and throat 22 and slightly less than the diameter of the panel aperture so that when the pellet is inserted as shown in Fig. 6, the shank will be deformed or expanded to provide a shoulder portion 32 tightly engaging the back of the workpiece and cooperating with the head 14 to retain the stud and workpiece in assembled relationship.

While the pellet may be inserted into the hollow shank in various ways, it is preferably inserted by utilizing an impact driving tool which may be similar to an airgun, not shown, but preferably an impact tool such as the tool 34 shown in Fig. 9 is used. The tool 34 includes a cylinder 36 formed from a non-magnetic alloy and having a nozzle 38 adapted to seat within the flared mouth 18 of the plastic member. A magnetic rod 40 is slidably disposed within the cylinder and is resiliently urged to the retracted position shown by a compression spring 42 acting against a flange 44 fixed on the rod. A cap member 46 is threaded onto the end of the cylinder for engaging the flange 44 and limiting rearward movement of the rod, and an extension 48 of the rod slidably projects through an aperture in the cap and has a handle 50 secured thereto. It will be appreciated that the magnetic rod will retain one of the steel pellets 16 in the position shown, so that when the end of the handle 50 is struck, the rod will advance and force the pellet through the bore 52 of the nozzle and into the plastic stud member. Forward movement of the rod is limited by engagement of the handle 50 with the cap 46 and preferably a wear plate 54 is provided on the handle for engaging the cap. Mounted on the cylinder 36 is a fitting 56 into which a cartridge 58 containing a supply of the pellets may be snapped. The fitting merges with elongated means 60 providing a tunnel for directing the pellets from the cartridge to a lateral opening 60 in the side of the cylinder 36 and into the nozzle bore.

When utilizing the tool 34 for inserting a pellet into a plastic stud 10 previously applied to the apertured workpiece, the nozzle 38 is first seated in the mouth 18 as indicated by the broken lines in Fig. 4. Then the handle 50 is struck and the pellet is forced through the throat into the hollow shank. As the pellet passes through the throat, the deformable plastic material surrounding the throat is squeezed outwardly as shown in Fig. 5. However, after the pellet has passed through the throat to the position shown in Fig. 6, the deformable material surrounding the throat contracts or flows back toward its original position so that the opening of the throat is restricted and the pellet cannot become disassembled. It should be noted that as the pellet is inserted the head portion 14 is drawn tightly against the outer surface of the panel, the shoulder portion 32 is pressed tightly against the inner panel surface and the exterior of the throat portions is pressed tightly against the aperture wall so that the panel aperture is effectively sealed.

As mentioned above, the plastic material of the stud member is relatively soft so that the head of the stud member may be utilized as a bumper for a door when the stud member is applied to a panel or workpiece as shown in Fig. 6. However, the stud member and pellet assembly may also be used as a rivet or fastening device for connecting a plurality of apertured panels or workpieces or for mounting an article to an apertured workpiece. For example, in Figs. 1 and 2, the stud is shown as applied through an aperture in a cable holding strap 62 for mounting the strap to an apertured workpiece 64.

Fig. 7 shows a modified form of the present invention which is similar to the above described embodiment as indicated by the application of identical reference numerals with the suffix "a" added to corresponding elements. In this embodiment the head portion 14a has been modified so that it includes laterally extending wings 66 and 68 having end portions 70 and 72 flared outwardly to receive and retain inwardly turned flanges of a molding strip 74.

Fig. 8 shows another modified form of the present invention which is similar to the above described embodiment as indicated by the application of identical reference numerals with the suffix "b" added to corresponding elements. In this embodiment, the head portion 14b has been modified to include laterally extending looped resilient wing portions 76 and 78 which are adapted to clamp elongated members or wires 80 and 82 against the apertured workpiece.

From the above description it is seen that the present invention has provided a novel device or assembly adapted to be applied to an apertured workpiece, which device fully satisfies the objects heretofore set forth. More specifically, it is seen that the present invention has provided a novel device which may be easily applied to the apertured workpiece without unduly stretching the workpiece. It is also seen that the present invention has provided a novel device including a plastic stud member which may be made of relatively soft and deformable material and which can still be connected with the apertured workpiece in a secure manner.

While the preferred embodiments of the present invention have been shown and described herein, it is obvious that many structural details may be changed without departing from the spirit and scope of the appended claims.

The invention is claimed as follows:

1. A two-piece blind fastener device of the type described adapted to be applied from the exposed surface to the blind surface of an apertured workpiece, and comprising a deformable elastic shank portion for insertion through the workpiece and an enlarged integral head portion for overlying the exposed surface of the workpiece, a passageway extending axially through said head portion and into said shank portion, a rigid pellet having a cross section transversely of the passageway similar to, but greater than the said passageway in said shank portion, said pellet being insertable through the passageway in said head portion and into the shank portion thereby deforming said shank portion laterally to provide an abutment for engagement with the blind surface of the workpiece, the deformable material surrounding said passageway in the shank portion and within said aperture expanding laterally during passage of the pellet therethrough and thereafter contracting to restrict the passageway and retain the pellet therein, the length of said passageway in the shank portion beyond the blind surface of the workpiece being less than the length of the axis of the pellet in the direction of insertion into the shank portion to ensure contracting engagement with the trailing end of pellet by the expanded shank portion for holding the pellet against said abutment, and abutment means at the entering end of the shank portion preventing passage of the pellet therethrough.

2. A two-piece blind fastener as claimed in claim 1, wherein the abutment means substantially completely closes the end of the passageway in the shank portion and includes a vent extending therethrough to permit air within the shank portion to escape during insertion of the pellet.

3. A two-piece blind fastener as claimed in claim 1, wherein the passageway in the head portion includes a flared mouth to facilitate insertion of the pellet into the passageway.

4. A two-piece blind fastener as claimed in claim 1, wherein the pellet is a substantially ball-like spherical element.

5. A two-piece blind fastener as claimed in claim 1, wherein the juncture between the passageway in the head portion and the passageway in the shank portion comprises a throat which is expanded during insertion of the pellet into the passageway in the shank portion.

References Cited in the file of this patent

UNITED STATES PATENTS

| 583,309 | McLaughlin | May 25, 1897 |
| 608,178 | Cock | Aug. 2, 1898 |
| 1,120,369 | Booraem | Dec. 8, 1914 |
| 2,039,401 | Foges | May 5, 1936 |
| 2,359,629 | Dexter | Oct. 3, 1944 |
| 2,379,529 | Kennedy | July 3, 1945 |
| 2,398,532 | Keehn | Apr. 16, 1946 |
| 2,542,144 | Kearns | Feb. 20, 1951 |
| 2,592,130 | Erb | Apr. 8, 1952 |

FOREIGN PATENTS

| 737,480 | Germany | July 15, 1943 |

Notice of Adverse Decision in Interference

In Interference No. 88,512 involving Patent No. 2,759,390, B. Edwards, Two-piece expandable elastic fastening device of the rivet type, final judgment adverse to the patentee was rendered August 22, 1957, as to claims 1, 4, and 5.

[*Official Gazette October 1, 1957.*]